(12) United States Patent
Xiong et al.

(10) Patent No.: US 10,484,062 B2
(45) Date of Patent: Nov. 19, 2019

(54) TRANSMIT BEAMFORMING

(71) Applicant: Intel IP Corporation, Santa Clara, CA (US)

(72) Inventors: Gang Xiong, Portland, OR (US); Yushu Zhang, Beijing (CN); Yuan Zhu, Beijing (CN); Jong-Kae Fwu, Sunnyvale, CA (US); Ralf Bendlin, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/747,000

(22) PCT Filed: Dec. 11, 2015

(86) PCT No.: PCT/US2015/065161
§ 371 (c)(1),
(2) Date: Jan. 23, 2018

(87) PCT Pub. No.: WO2017/030601
PCT Pub. Date: Feb. 23, 2017

(65) Prior Publication Data
US 2018/0212659 A1     Jul. 26, 2018

Related U.S. Application Data

(60) Provisional application No. 62/207,762, filed on Aug. 20, 2015.

(51) Int. Cl.
*H04B 7/06* (2006.01)
*H04W 72/04* (2009.01)
(Continued)

(52) U.S. Cl.
CPC ......... *H04B 7/0617* (2013.01); *H04B 7/0695* (2013.01); *H04W 72/046* (2013.01); *H04W 74/0866* (2013.01); *H04W 16/28* (2013.01)

(58) Field of Classification Search
CPC . H04B 7/0617; H04B 7/0695; H04W 72/046; H04W 74/086; H04W 16/28
See application file for complete search history.

(56) References Cited

U.S. PATENT DOCUMENTS

2013/0059619 A1    3/2013   Kim et al.
2013/0114505 A1*   5/2013   Haim ................. H04W 52/146
                                                            370/328
(Continued)

FOREIGN PATENT DOCUMENTS

CN     107852705 A     3/2018
WO     2017/030601 A1  2/2017

OTHER PUBLICATIONS

International Search Report and Written Opinion received for International Application No. PCT/US2015/065161, dated May 19, 2016, 10 pages.

(Continued)

*Primary Examiner* — Sam K Ahn
*Assistant Examiner* — Amneet Singh
(74) *Attorney, Agent, or Firm* — Jaffery Watson Mendonsa & Hamilton LLP

(57) ABSTRACT

In one example, a user equipment capable to establish a communication connection with a network entity, the user equipment comprising processing circuitry to receive, from a network entity, a primary synchronization signal (xPSS) and a beamforming reference signal (xBRS) transmitted using beamforming sweeping, identify at least one suitable transmission beamforming pattern from the network entity, transmit, to the network entity, an identifier associated with the at least one suitable beamforming pattern for a downlink signal, transmit, to the network entity, an uplink transmission of the physical random access channel (PRACH) transmitted using beamforming sweeping, receive, from the user equipment, a signal comprising an identifier associated with (Continued)

the at least one suitable beamforming pattern in the uplink transmission, and use the at least one suitable beamforming pattern in subsequent communication with the network equipment. Other examples are also disclosed and claimed.

14 Claims, 11 Drawing Sheets

(51) Int. Cl.
*H04W 74/08* (2009.01)
*H04W 16/28* (2009.01)

(56) References Cited

U.S. PATENT DOCUMENTS

| | | |
|---|---|---|
| 2014/0146863 A1 | 5/2014 | Seol et al. |
| 2015/0009984 A1 | 1/2015 | Jung et al. |
| 2018/0359790 A1* | 12/2018 | Ingale ............... H04W 8/24 |

OTHER PUBLICATIONS

Panasonic, "Impact of LAA Beamforming on LBT Behavior," Aug. 14, 2015, 4 pages, R1-153976, 3GPP TSG RAN WG1 Meeting #82, Beijing, CN.

LG Electronics, "Beamformed CSI-RS Related Enhancements Based on the Identified Approaches," Aug. 15, 2015, 7 pages, R1-154274, 3GPP TSG RAN WG1 Meeting #82, Beijing, CN.

* cited by examiner

TRANSMIT BEAMFORMING

RELATED APPLICATIONS

This application claims the benefit of priority under 35 U.S.C. § 371 to International Application No. PCT/US2015/065161 filed Dec. 11, 2015, entitled TRANSMIT BEAMFORMING which in turn claims the benefit of priority under 35 U.S.C. § 119(e) of U.S. Provisional Application Ser. No. 62/207,762, filed Aug. 20, 2015, entitled ENABLING UE TRANSMIT BEAMFORMING USING PRACH FOR 5G SYSTEM, the disclosures of which are incorporated herein by reference in their entirety.

FIELD

The present disclosure generally relates to the field of electronic communication. More particularly, aspects generally relate to transmit beamforming in communication systems.

BACKGROUND

Wireless communication systems which utilize mid-band (e.g., 6 GHz to 30 GHz) and high-band (e.g., over 30 GHz) frequency ranges may utilize beamforming techniques to compensate for relatively large path loss incurred during transmission between a network entity such as an eNodeB (eNB) and one or more user equipment (UE). Accordingly, techniques for transmit beamforming may find utility, e.g., in electronic communication systems for electronic devices.

BRIEF DESCRIPTION OF THE DRAWINGS

The detailed description is provided with reference to the accompanying figures. The use of the same reference numbers in different figures indicates similar or identical items.

Figure 1:
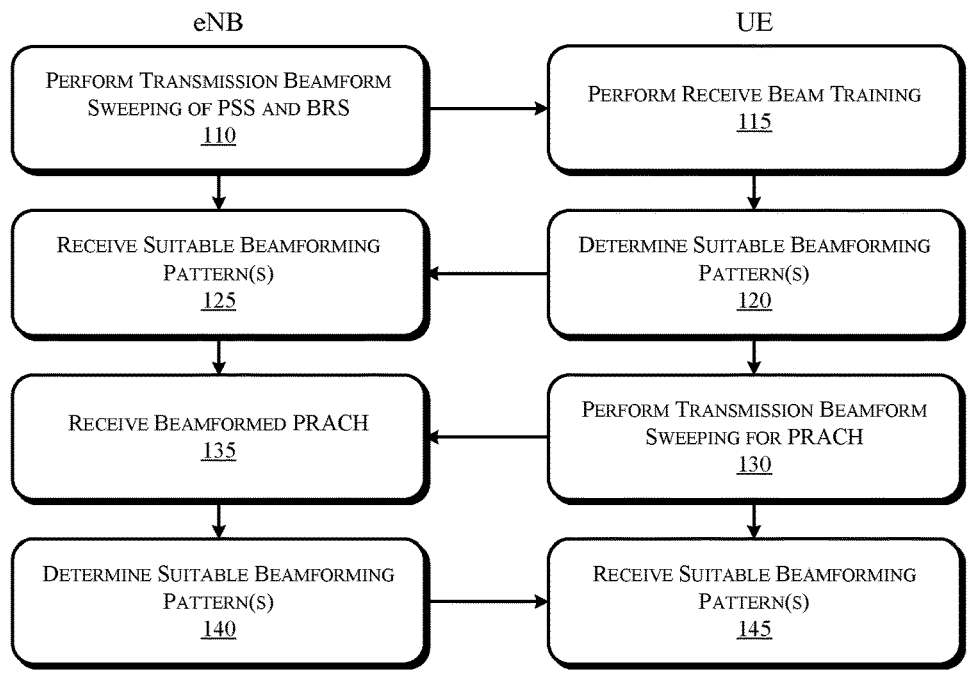
FIGS. 1-2 are flowcharts illustrating operations in a method to implement transmit beamforming in a communication system in accordance with various examples discussed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

As described in brief above, techniques for transmit beamforming may find utility, e.g., in communication systems for electronic devices. Subject matter described herein provides techniques to implement beamforming in user equipment (UE) in communication networks. In some examples techniques to implement UE transmit and/or receive beamforming in UE using the physical random access channel (PRACH) for 5G wireless systems are presented. Additional features and characteristics these techniques and communication systems in which the techniques may be incorporated are described below with reference to FIGS. 1-15.

In some examples techniques described herein enable UE to perform transmit (Tx) beamforming during an initial beam acquisition stage with an eNB. In a first example a UE may transmit one or more instances of a PRACH to an eNB using either the same or different beamforming weights. The eNB evaluates the received PRACH to determine one or more suitable beams (e.g., the strongest beams received at the eNB) and provides as feedback to the UE the beam index associated with the one or more suitable beams. The UE may select for transmission a beamform associated with the one or more beams selected determined by the eNB as suitable beams to use for transmission to the eNB. In another example the UE may transmit a PRACH to the eNB, which may reply with a RAR message indicating a successful receipt of the PRACH and identifying the beam index. This process may be repeated by the UE using different beamforming weights. The UE may then select for transmission a beamform associated with one or more of the beam index(es) received from the eNB. The process may be repeated on a periodic basis or in response to one or more events to allow the UE and the eNB to determine Tx beamforms for the UE.

Figure 2:
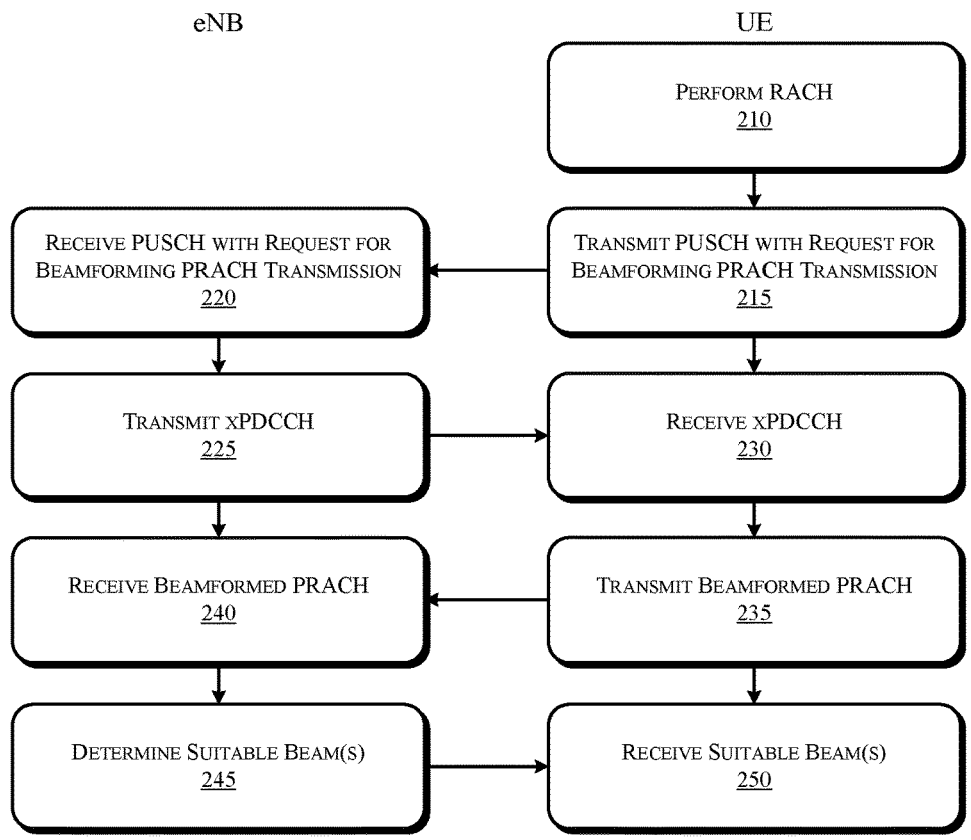

FIGS. 1-2 are flowcharts illustrating operations in a method to implement transmit beam forming in a communication system in accordance with various examples discussed herein. Referring first to FIG. 1, at operation 110 an eNB performs transmit (Tx) beam sweeping for the transmission of a primary synchronization signal (PSS) and a beamforming reference signal (BRS). In order to enable UE Rx beamforming training, a predetermined beamforming pattern or UE assumption may be utilized. In one example, Tx beamforming patterns for the transmission of the PSS and/or the BRS may be repeated periodically (e.g., every X milliseconds), where X can be predefined in a specification or configured by higher layers of a communication network via UE-specific dedicated radio resource control (RRC) signaling from a primary cell (PCell). In this case, a UE may perform receive beam scanning on the PSS and/or BRS positions with the same Tx beamforming weights.

At operation 115 the UE performs receive beam training which, at operation 120, determines one or more suitable beamforming patterns for Tx beamforming from the eNB. In some examples the UE identifies the beamforming pattern which provides the strongest reception as the best eNodeB Tx beam. The one or more suitable Tx beamforming patterns, including the best beamforming pattern, are transmitted from the UE to the eNB. Depending on the beamforming pattern applied for the Tx of PSS and BRS, it may be up to UE implementation to determine the best eNB Tx and UE receive beam pair to maximize the receive power. Further, the UE may report the best eNodeB Tx beam index via PRACH or in the PUSCH transmission in the RACH procedure. At operation 125 the eNB receives the suitable beamforming pattern(s) from the UE. The eNB may use one or more of the beamforming patterns received from the UE in subsequent transmissions to the UE.

In the case when downlink (DL) and uplink (UL) reciprocity is not guaranteed, additional UE transmission beam refinement can be implemented. At operation 130 the UE may perform transmission beam sweeping for the transmission of PRACH. At operation 135 the eNB receives the beamformed PRACH Tx transmission, and at operation 140 the eNB determines one or more suitable beamforming patterns, which the eNB transmits to the UE. At operation 145 the UE receives the one or more suitable Tx beamforming patterns from the eNB.

A first example of a technique for Tx beamforming is described with reference to FIGS. 2, 3, and 4A-4B. In one example the transmit power can be determined based on a calculated path loss and configured transmit power parameter. Referring first to FIG. 2, at operation 210 the UE performs conventional random access (RACH) procedure, e.g., by using omni-transmission and omni-receive antenna. In some examples the UE may adjust timing advance based on feedback received from eNodeB. Further, after a successful RACH procedure, UE may receive the Cell Radio Network Temporary Identifier (C-RNTI) from eNodeB for subsequent data transmission.

At operation 215 the UE transmits the PUSCH which contains a request for the Tx beamformed PRACH transmission. The resource allocation for the PUSCH transmission may be carried in a reauthorization request (RAR) message or indicated in the downlink control information (DCI) format for uplink grant.

At operation 220 the eNB receives the PUSCH with the request, and at operation 225 the eNB transmits a 5G physical downlink control channel (xPDCCH) to the UE. At operation 230 the UE receives the XPDCCH and, in response, at operation 235, initiates a transmission of the Tx beamformed PRACH. In some examples the UE transmits the beamformed PRACH signal in a number (N) subframes using the designated PRACH signature indicated in the DCI. The UE may transmit PRACH using different or same beamforming weights within one subframe depending on the parameters indicated in the DCI. Additionally, in some examples the UE may utilize the timing advance value obtained in operation 240 for synchronized PRACH transmission.

At operation 240 the eNB receives the beamformed PRACH and, at operation 245, the eNB determines the one or more suitable beamforms and may optionally determine the best UE transmission beams. The eNB transmits the beam index (or indices) associated with the suitable beams in terms of PRACH time offset using one or more RAR message, the xPDCCH, or dedicated RRC signalling. In a single frequency network type of operation, one eNodeB may feedback multiple suitable Tx beams from multiple eNodeBs.

Figure 3:
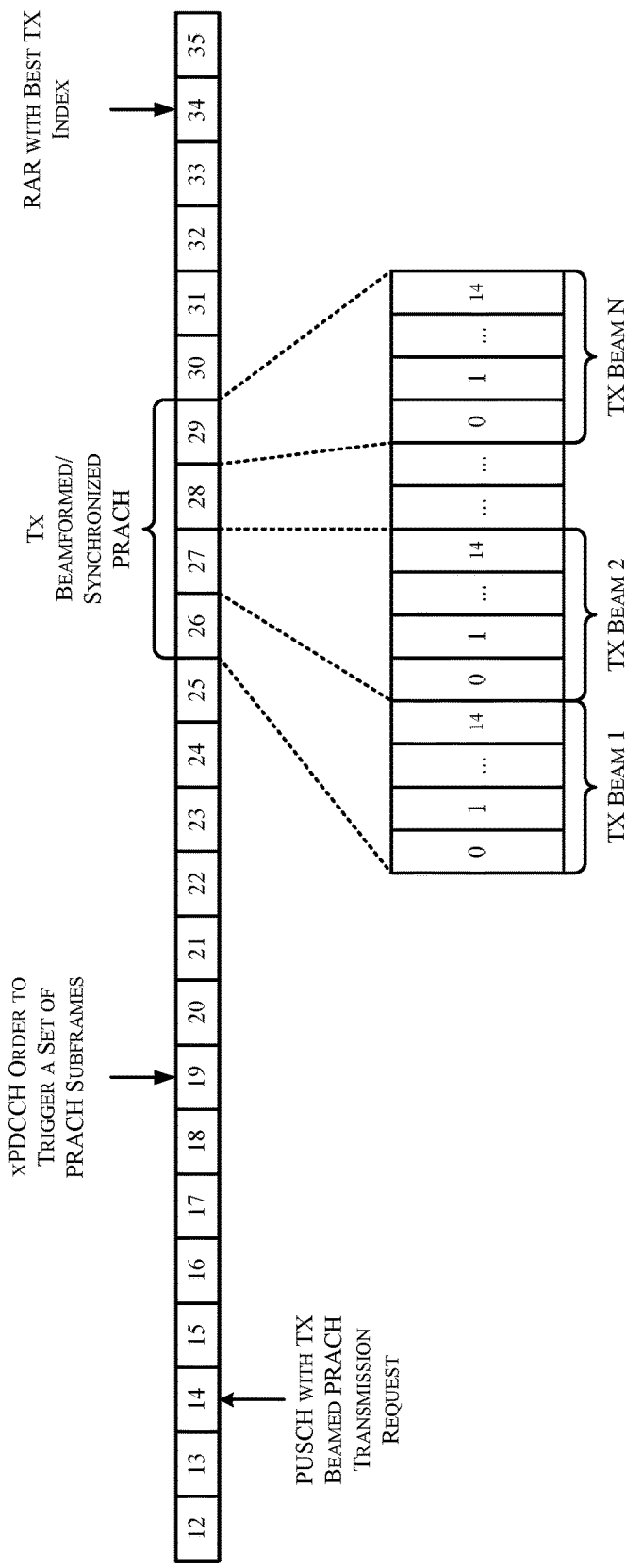
FIG. 3 is a diagram illustrating timing of transmissions in a method to implement transmit beamforming in a communication system in accordance with various examples discussed herein.
Figures 4A, 4B:
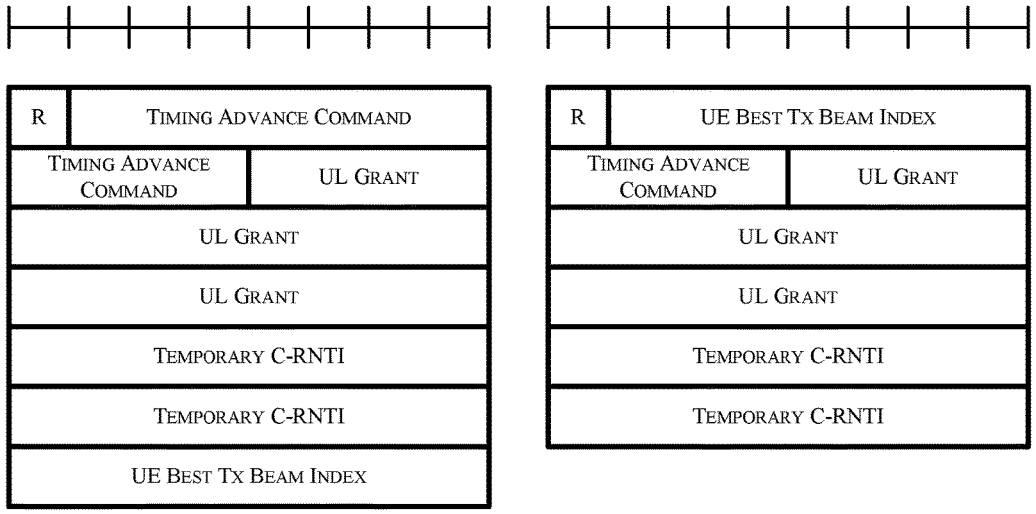
FIGS. 4A and 4B are schematic illustrations of MAC RARs which may be used in a method to implement transmit beamforming in a communication system in accordance with various examples discussed herein.

FIG. 3 is a diagram illustrating timing of transmissions in a method to implement transmit beam forming in a communication system in accordance with various examples discussed herein. Note that the timing gap between the transmission of downlink (DL) and uplink (UL) signal can be extended. In the example depicted in FIG. 3, four (4) subframes are allocated for the transmission of Tx beamformed and synchronized PRACH signal. Further, the same Tx beamforming weights are applied on the repeated PRACH transmission within one subframe. In the example depicted in FIG. 3, fifteen (15) repeated PRACH signals are transmitted in one subframe. However, one skilled in the art will recognize that the particular number of PRACH signals can be extended to other values. Additionally, different Tx beamforming weights may be applied on the PRACH transmission within one subframe.

As mentioned above, in some examples one or more new field(s) may be added in the DCI format to trigger contention free PRACH transmission. In some examples, DCI format 1A can be used for random access procedure initiated by a PDCCH order. In particular, the Preamble Index and PRACH Mask Index are included in the DCI format to allow UE to transmit the PRACH signal to use a designated PRACH signature in a synchronous manner. To trigger the Tx beamformed PRACH, an additional bit field can be included: For instance, a bit "1" may indicate that the Tx beamformed PRACH is triggered, while "0" indicates that the Tx beamformed PRACH is not triggered. Further, the configuration information for the transmission of Tx beamformed PRACH can also be included. For instance, the number of subframes allocated and/or the number of Tx beams are used for the transmission of Tx beamformed PRACH signal. In the example as shown in the FIG. 2, 4 subframes and 4 Tx beams are used for the Tx beamformed PRACH signal.

In some examples the eNodeB may feedback the UE best beam index in terms of PRACH time offset via an RAR message. In this case, UE best beam index or PRACH time offset can be included in the MAC RAR as shown in the FIGS. 4A and 4B. In the example depicted in FIG. 4A, a new field (UE Best TX Beam Index) can be added in the MAC RAR. Alternatively, in FIG. 4B, the timing advance command can be replaced by a field which contains UE best Tx beam index. Similarly, the best Tx beam index or PRACH time offset can be indicated in the DCI format used for the scheduling of RAR message. Further, multiple Tx beam indexes can be signaled via RAR message or xPDCCH.

Figure 5:
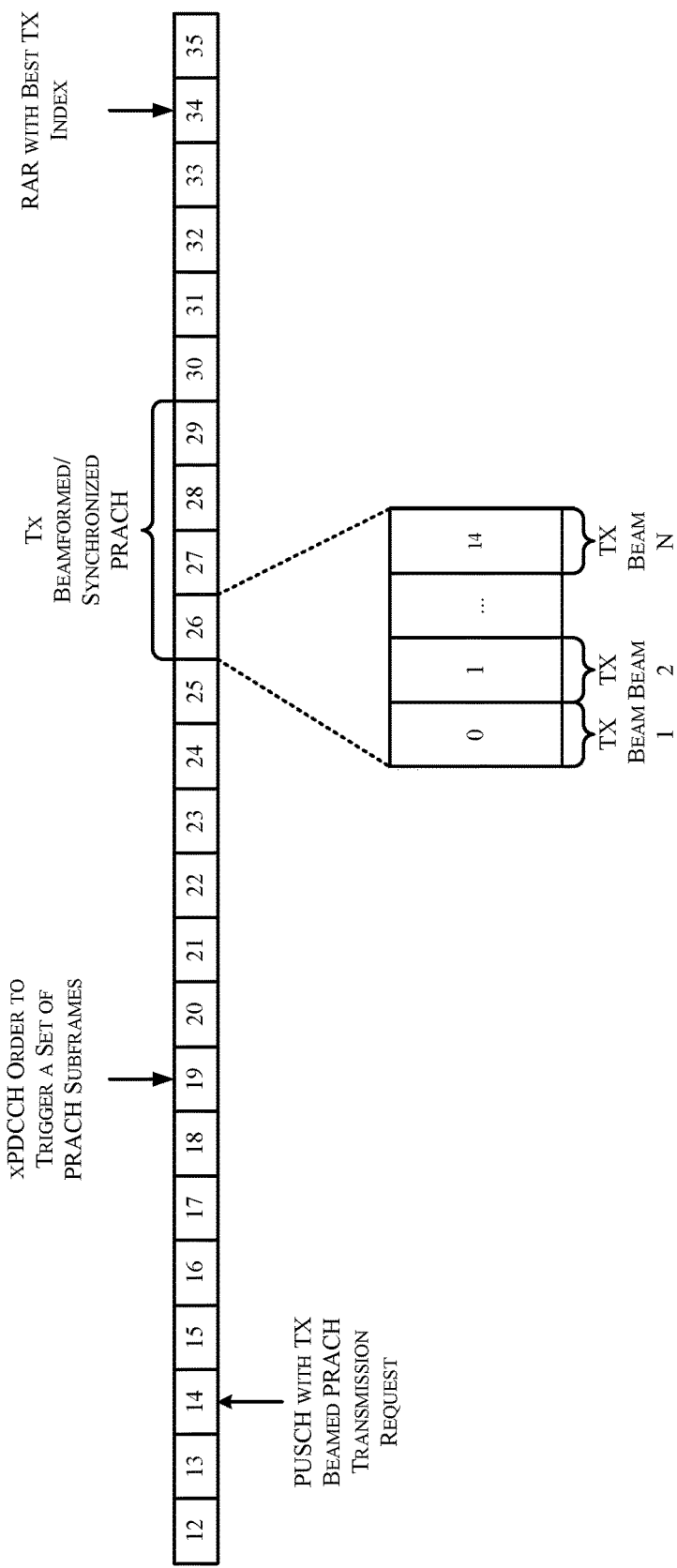
FIG. 5 is a diagram illustrating timing of transmissions in a method to implement transmit beamforming in a communication system in accordance with various examples discussed herein.

Referring to FIG. 5, in the case in which the eNB may assume the optimal eNodeB Rx beam is obtained (e.g., in the first step from omni-Tx PRACH signal), the number of subframes used for the Tx beamformed PRACH can be substantially reduced. For instance, compared to the example depicted in FIG. 3, the UE may only transmit the repeated RPACH within one subframe and different Tx beamforming weights are applied on the PRACH signal in each symbol. In the exampled depicted in FIG. 5, only a single (1) subframe is allocated for the transmission of Tx beamformed PRACH. In some examples 15 Tx beamformed PRACH signals may be transmitted in one subframe. However, one skilled in the art will recognize that the number of PRACH signals can be easily extended to other values.

Figure 6:
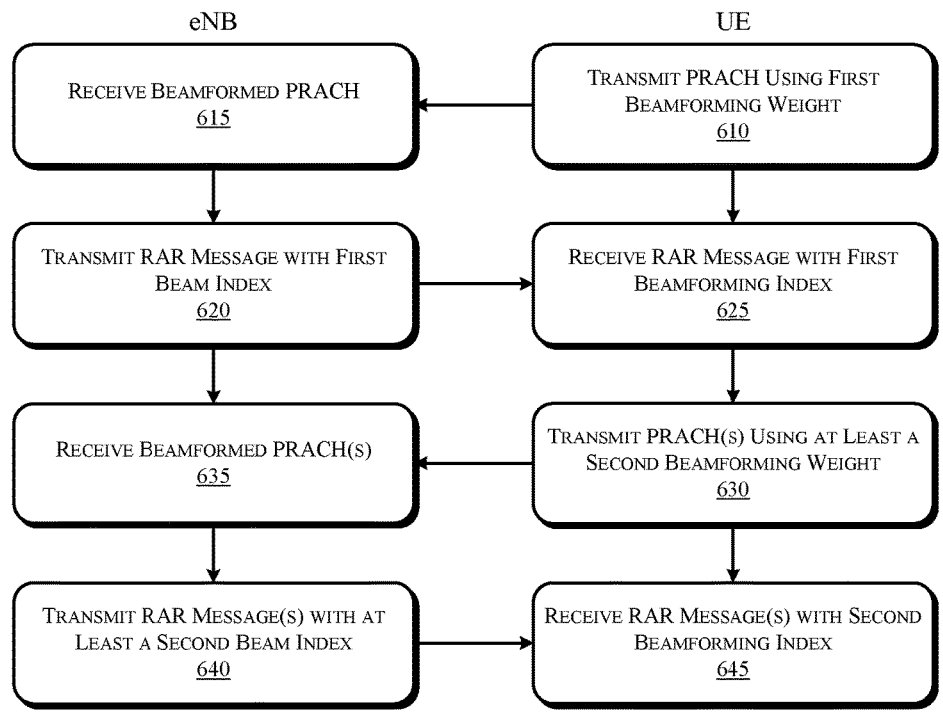
FIG. 6 is a flowchart illustrating operations in a method to implement transmit beamforming in a communication system in accordance with various examples discussed herein.
Figure 7:
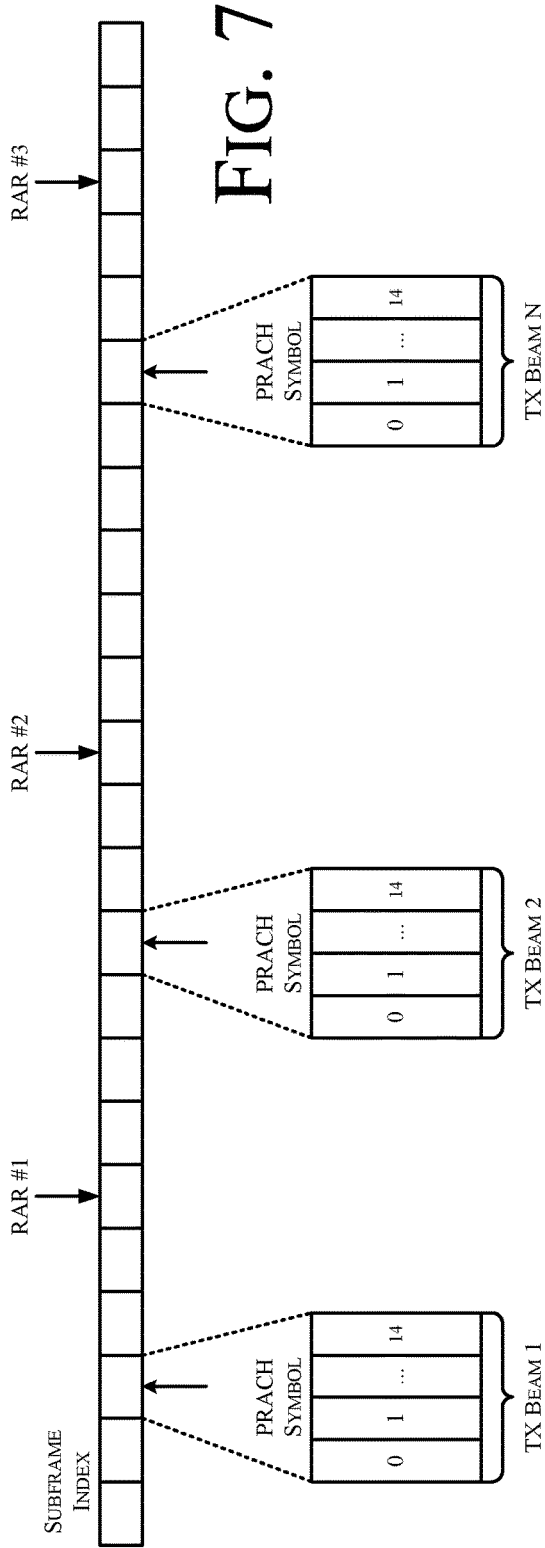
FIG. 7 is a diagram illustrating timing of transmissions in a method to implement transmit beamforming in a communication system in accordance with various examples discussed herein.
Figure 8:
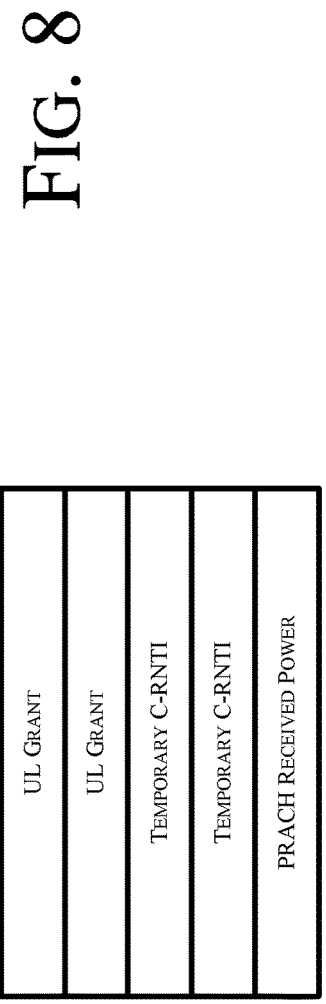
FIG. 8 is a schematic illustration of a MAC RARs which may be used in a method to implement transmit beamforming in a communication system in accordance with various examples discussed herein.

A second example of a technique for Tx beamforming is described with reference to FIGS. 6-8. Referring to FIGS. 6-8, at operation 610 the UE transmits the repeated PRACH signal using first Tx beamforming weight in the first subframe. At operation 615 the eNB receives the beamformed PRACH signal and at operation 620 the eNB transmits a RAR message to the UE which includes the beam index associated with the first beamforming weight.

At operation 625 the UE receives the RAR message and at operation 630 the UE transmits the repeated RPCH signal using a second Tx beamforming weight in the second subframe. At operation 635 the eNodeB detects the beamformed PRACH transmission and at operation 640 the eNB transmits a RAR message to the UE which includes the beam index associated with the second beamforming weight, which is received by the UE at operation 645. In practice, operations 630-645 may be repeated for some number (N) of TX beamforming weights.

Referring to FIG. 7, one skilled in the art will recognize that other timing gap between the transmission of DL and UL signal can easily extended to other values. In the example depicted in FIG. 7, repeated PRACH is transmitted within a single subframe and during the transmission of repeated PRACH the single subframe, the same UE Tx beamforming weights are applied. In the example depicted in FIG. 7, 15 repeated PRACH signals may be transmitted in one subframe. However, one skilled in the art will recognize that the number of PRAC signals may be extended to other values. In the case that partial UL/DL reciprocity can be assumed, the number of Tx beamformed PRACH transmission (N) can be reduced, which may help to reduce the collision rate and Tx beamforming training latency.

Referring to FIG. 8, in some examples the RAR message may include additional parameters such as a system frame number and/or an indication of the PRACH received power. The UE may use these parameters to determine the best Tx beam. In one example, when PRACH received power is included in the RAR message, UE may compare all the feedback from eNodeB and determine the best Tx beam index which corresponds to the maximum PRACH received power. Regardless which methodology is implemented, the UE may select for transmit one or more of the beams from the suitable beam(s) identified by the eNB.

Figure 9:
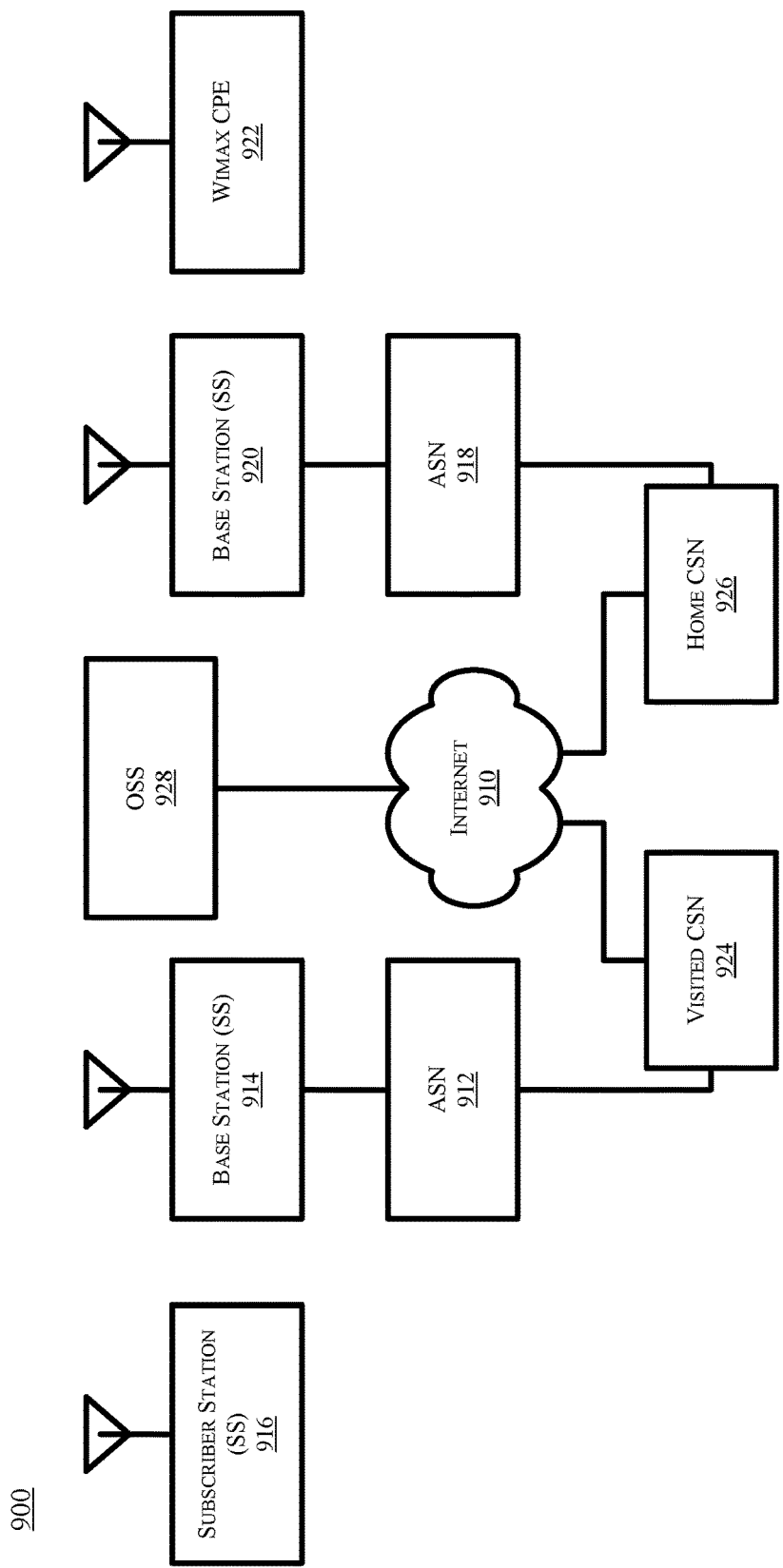
FIG. 9 is a schematic, block diagram illustration of a wireless network in accordance with one or more exemplary embodiments disclosed herein.

FIG. 9 is a schematic, block diagram illustration of a wireless network 900 in accordance with one or more exemplary embodiments disclosed herein. One or more of the elements of wireless network 900 may be capable of implementing methods to identify victims and aggressors according to the subject matter disclosed herein. As shown in FIG. 9, network 900 may be an Internet-Protocol-type (IP-type) network comprising an Internet-type network 910, or the like, that is capable of supporting mobile wireless access and/or fixed wireless access to Internet 910.

In one or more examples, network 900 may operate in compliance with a Worldwide Interoperability for Microwave Access (WiMAX) standard or future generations of WiMAX, and in one particular example may be in compliance with an Institute for Electrical and Electronics Engineers 802.16-based standard (for example, IEEE 802.16e), or an IEEE 802.11-based standard (for example, IEEE 802.11 a/b/g/n standard), and so on. In one or more alternative examples, network 900 may be in compliance with a 3rd Generation Partnership Project Long Term Evolution (3GPP LTE), a 3GPP2 Air Interface Evolution (3GPP2 AIE) standard and/or a 3GPP LTE-Advanced standard. In general, network 900 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects.

As an example of mobile wireless access, access service network (ASN) 912 is capable of coupling with base station (BS) 914 to provide wireless communication between subscriber station (SS) 916 (also referred to herein as a wireless terminal) and Internet 910. In one example, subscriber station 916 may comprise a mobile-type device or information-handling system capable of wirelessly communicating via network 900, for example, a notebook-type computer, a cellular telephone, a personal digital assistant, an M2M-type device, or the like. In another example, subscriber station is capable of providing an uplink-transmit-power control technique that reduces interference experienced at other wireless devices according to the subject matter disclosed herein. ASN 912 may implement profiles that are capable of defining the mapping of network functions to one or more physical entities on network 900. Base station 914 may comprise radio equipment to provide radio-frequency (RF) communication with subscriber station 916, and may comprise, for example, the physical layer (PHY) and media access control (MAC) layer equipment in compliance with an IEEE 802.16e-type standard. Base station 914 may further comprise an IP backplane to couple to Internet 910 via ASN 912, although the scope of the claimed subject matter is not limited in these respects.

Network 900 may further comprise a visited connectivity service network (CSN) 924 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 926, and the scope of the claimed subject matter is not limited in these respects.

Visited CSN 924 may be referred to as a visited CSN in the case, for example, in which visited CSN 924 is not part of the regular service provider of subscriber station 916, for example, in which subscriber station 916 is roaming away from its home CSN, such as home CSN 926, or, for example, in which network 900 is part of the regular service provider of subscriber station, but in which network 900 may be in another location or state that is not the main or home location of subscriber station 916.

In a fixed wireless arrangement, WiMAX-type customer premises equipment (CPE) 922 may be located in a home or business to provide home or business customer broadband access to Internet 910 via base station 920, ASN 918, and home CSN 926 in a manner similar to access by subscriber station 916 via base station 914, ASN 912, and visited CSN 924, a difference being that WiMAX CPE 922 is generally disposed in a stationary location, although it may be moved to different locations as needed, whereas subscriber station may be utilized at one or more locations if subscriber station 916 is within range of base station 914 for example.

It should be noted that CPE 922 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 922 is capable of providing an uplink-transmit-power control technique that reduces interference experienced at other wireless devices according to the subject matter disclosed herein.

In accordance with one or more examples, operation support system (OSS) 928 may be part of network 900 to provide management functions for network 900 and to provide interfaces between functional entities of network 900. Network 900 of FIG. 9 is merely one type of wireless network showing a certain number of the components of network 900; however, the scope of the claimed subject matter is not limited in these respects.

Figure 10:
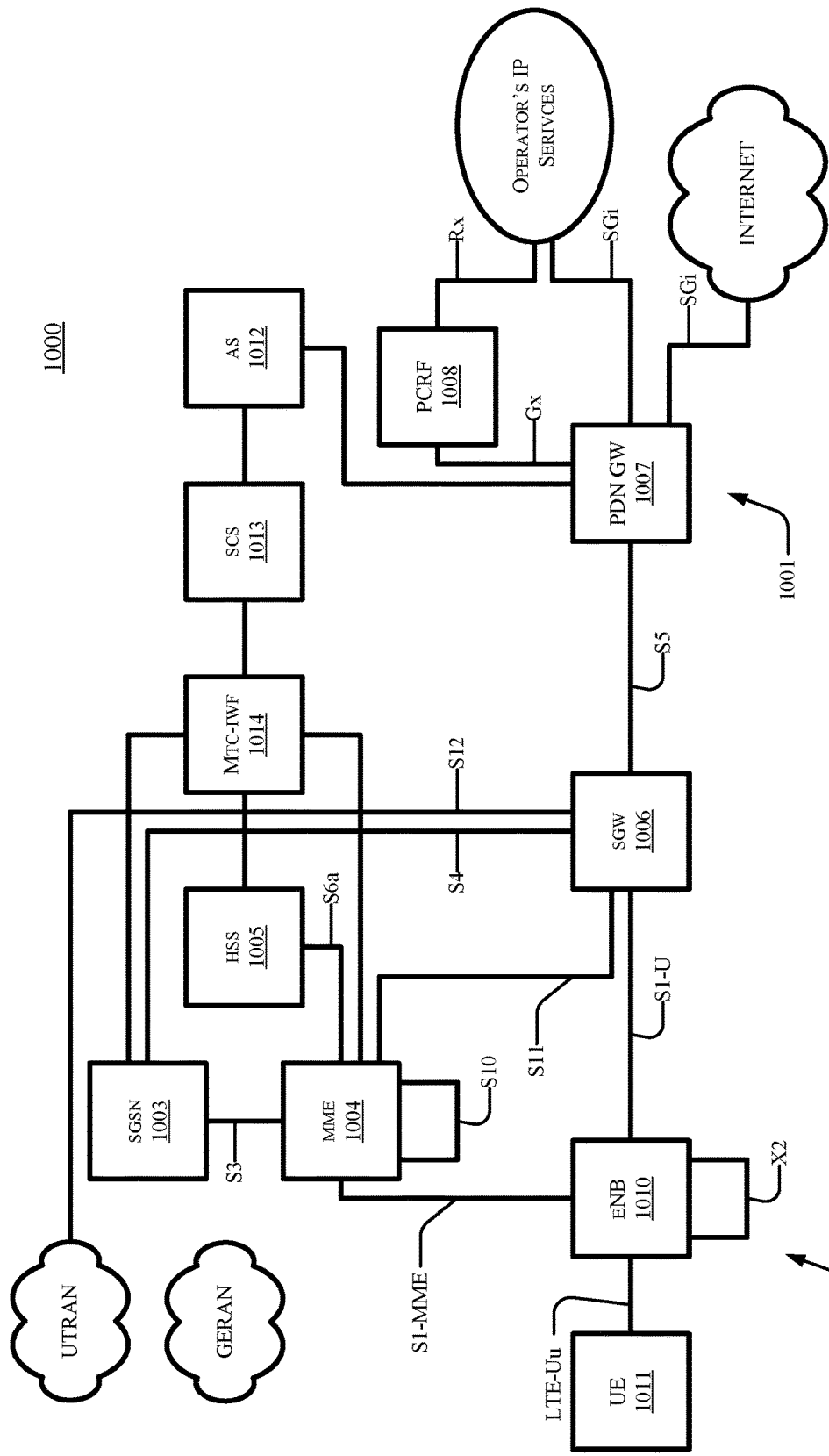
FIG. 10 is a schematic, block diagram illustration of a 3GPP LTE network in accordance with one or more exemplary embodiments disclosed herein.

FIG. 10 shows an exemplary block diagram of the overall architecture of a 3GPP LTE network 1000 that includes one or more devices that are capable of implementing methods to identify victims and aggressors according to the subject matter disclosed herein. FIG. 10 also generally shows exemplary network elements and exemplary standardized interfaces. At a high level, network 1000 comprises a core network (CN) 1001 (also referred to as an evolved Packet System (EPC)), and an air-interface access network E UTRAN 1002. CN 1001 is responsible for the overall control of the various User Equipment (UE) connected to the network and establishment of the bearers. CN 1001 may include functional entities, such as a home agent and/or an ANDSF server or entity, although not explicitly depicted. E UTRAN 1002 is responsible for all radio-related functions.

The main exemplary logical nodes of CN 1001 include, but are not limited to, a Serving GPRS Support Node 1003, the Mobility Management Entity 1004, a Home Subscriber Server (HSS) 1005, a Serving Gate (SGW) 1006, a PDN Gateway 1007 and a Policy and Charging Rules Function (PCRF) Manager 1008. The functionality of each of the network elements of CN 1001 is well known and is not described herein. Each of the network elements of CN 1001 are interconnected by well-known exemplary standardized interfaces, some of which are indicated in FIG. 10, such as interfaces S3, S4, S5, etc., although not described herein.

While CN 1001 includes many logical nodes, the E UTRAN access network 1002 is formed by at least one node, such as evolved NodeB (base station (BS), eNB or eNodeB) 1010, which connects to one or more User Equipment (UE) 1011, of which only one is depicted in FIG. 10. UE 1011 is also referred to herein as a wireless device (WD) and/or a subscriber station (SS), and can include an M2M-type device. In one EXAMPLE, UE 1011 is capable of providing an uplink-transmit-power control technique that reduces interference experienced at other wireless devices according to the subject matter disclosed herein. In one exemplary configuration, a single cell of an E UTRAN access network 1002 provides one substantially localized geographical transmission point (having multiple antenna devices) that provides access to one or more UEs. In another exemplary configuration, a single cell of an E UTRAN access network 1002 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 1004 by an S1 MME interface and to SGW 1006 by an S1 U interface. The protocols that run between the eNBs and the UEs are generally referred to as the "AS protocols." Details of the various interfaces are well known and not described herein.

The eNB 1010 hosts the PHYsical (PHY), Medium Access Control (MAC), Radio Link Control (RLC), and Packet Data Control Protocol (PDCP) layers, which are not shown in FIG. 10, and which include the functionality of user-plane header-compression and encryption. The eNB 1010 also provides Radio Resource Control (RRC) functionality corresponding to the control plane, and performs many functions including radio resource management, admission control, scheduling, enforcement of negotiated Up Link (UL) QoS, cell information broadcast, ciphering/ deciphering of user and control plane data, and compression/decompression of DL/UL user plane packet headers.

The RRC layer in eNB 1010 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 1011, generates pages for UEs 1011 over the air, broadcasts system information, controls UE measurement reporting, such as the periodicity of Channel Quality Information (CQI) reports, and allocates cell-level temporary identifiers to active UEs 1011. The RRC layer also executes transfer of UE context from a source eNB to a target eNB during handover, and provides integrity protection for RRC messages. Additionally, the RRC layer is responsible for the setting up and maintenance of radio bearers.

Figure 11:
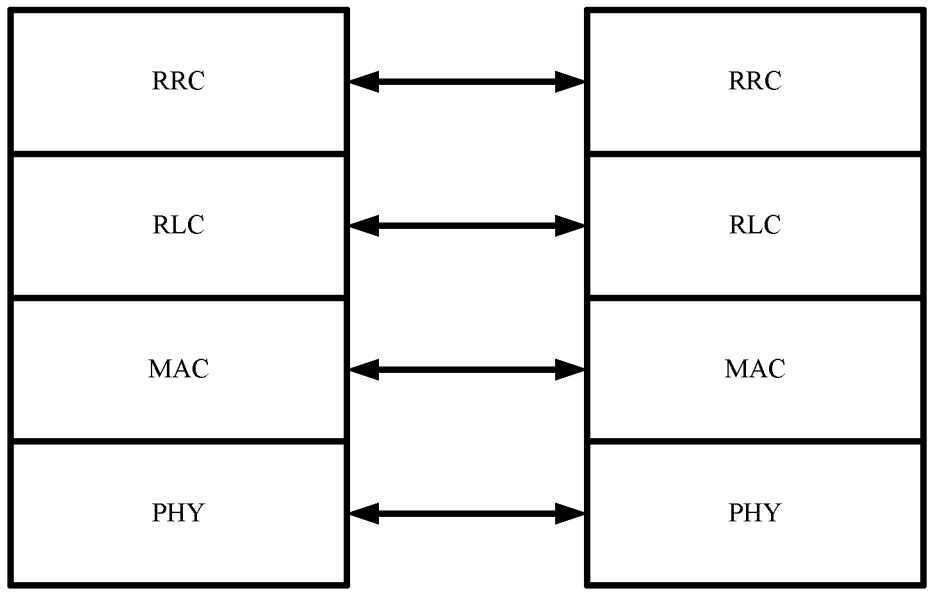
FIGS. 11 and 12 are schematic, block diagram illustrations, respectively, of radio interface protocol structures between a UE and an eNodeB based on a 3GPP-type radio access network standard in accordance with one or more exemplary embodiments disclosed herein.
Figure 12:
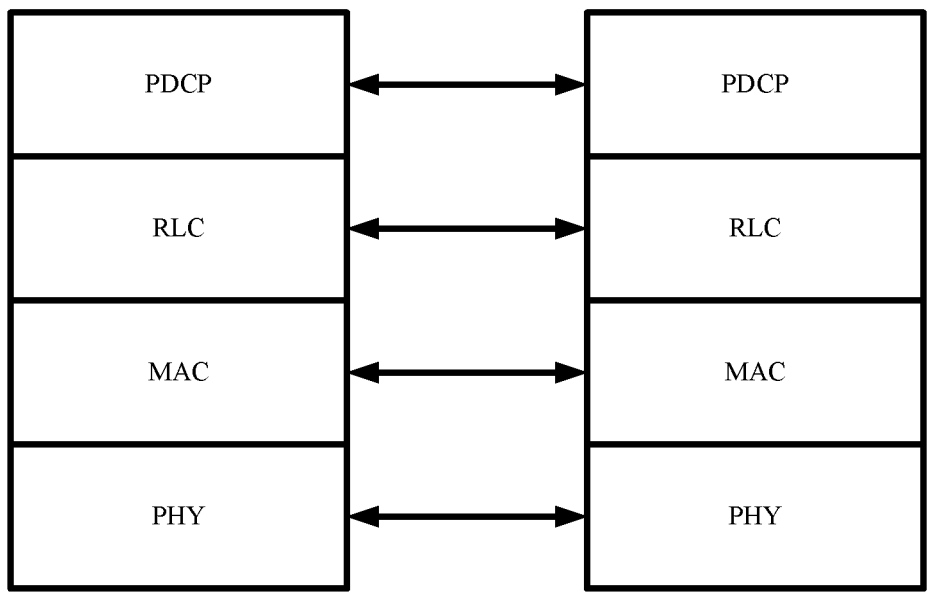

FIGS. 11 and 12 respectively depict exemplary radio interface protocol structures between a UE and an eNodeB that are based on a 3GPP-type radio access network standard and that is capable of providing an uplink-transmit-power control technique that reduces interference experienced at other wireless devices according to the subject matter disclosed herein. More specifically, FIG. 11 depicts individual layers of a radio protocol control plane and FIG. 12 depicts individual layers of a radio protocol user plane. The protocol layers of FIGS. 11 and 12 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C plane, and the DRB is used as a transmission passage of user data in the U plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 13:
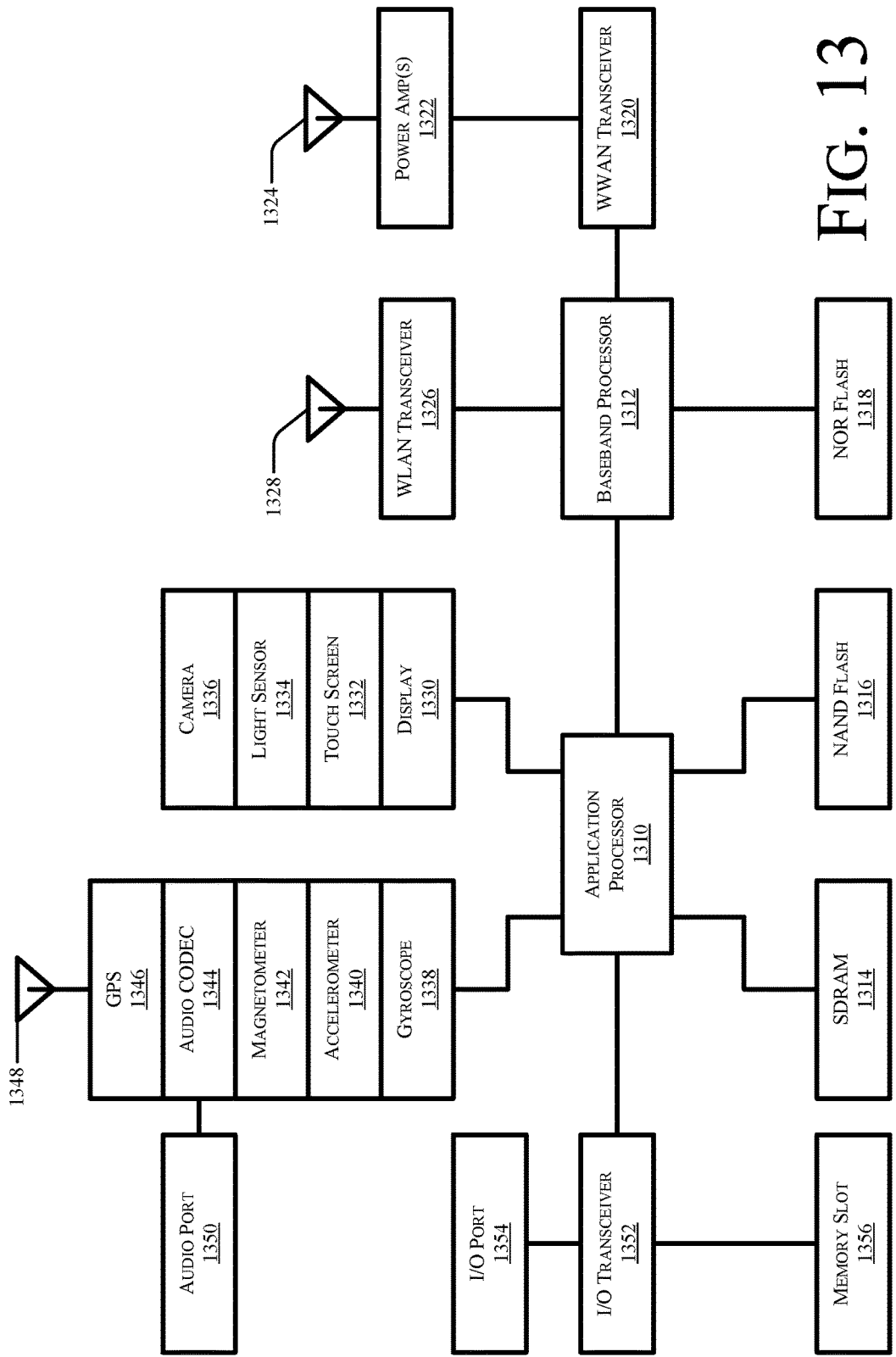
FIG. 13 is a schematic, block diagram illustration of an information-handling system in accordance with one or more exemplary embodiments disclosed herein.

FIG. 13 depicts an exemplary functional block diagram of an information-handling system 1300 that is capable of implementing methods to identify victims and aggressors according to the subject matter disclosed herein. Information handling system 1300 of FIG. 13 may tangibly embody one or more of any of the exemplary devices, exemplary network elements and/or functional entities of the network as shown in and described herein. In one example, information-handling system 1300 may represent eNB 1010, and/or UE 1011, with greater or fewer components depending on the hardware specifications of the particular device or network element. In another example, information-handling system may provide M2M-type device capability. Although information-handling system 1300 represents one example of several types of computing platforms, information-handling system 1300 may include more or fewer elements and/or different arrangements of elements than shown in FIG. 11, and the scope of the claimed subject matter is not limited in these respects.

In one or more examples, information-handling system 1300 may comprise one or more applications processor 1310 and a baseband processor 1312. Applications processor 1310 may be utilized as a general purpose processor to run applications and the various subsystems for information handling system 1300, and to capable of providing an uplink-transmit-power control technique that reduces interference experienced at other wireless devices according to the subject matter disclosed herein. Applications processor 1310 may include a single core or alternatively may include multiple processing cores wherein one or more of the cores may comprise a digital signal processor or digital signal processing core. Furthermore, applications processor 1310 may include a graphics processor or coprocessor disposed on the same chip, or alternatively a graphics processor coupled to applications processor 1310 may comprise a separate, discrete graphics chip. Applications processor 1310 may include on-board memory, such as cache memory, and further may be coupled to external memory devices such as synchronous dynamic random access memory (SDRAM) 1314 for storing and/or executing applications, such as capable of providing an uplink-transmit-power control technique that reduces interference experienced at other wireless devices according to the subject matter disclosed herein. During operation, and NAND flash 1316 for storing applications and/or data even when information handling system 1300 is powered off.

In one example, a list of candidate nodes may be stored in SDRAM 1314 and/or NAND flash 1316. Further, applications processor 1310 may execute computer-readable instructions stored in SDRAM 1314 and/or NAND flash 1316 that result in an uplink-transmit-power control technique that reduces interference experienced at other wireless devices according to the subject matter disclosed herein.

In one example, baseband processor 1312 may control the broadband radio functions for information-handling system 1300. Baseband processor 1312 may store code for controlling such broadband radio functions in a NOR flash 1318. Baseband processor 1312 controls a wireless wide area network (WWAN) transceiver 1320 which is used for modulating and/or demodulating broadband network signals, for example, for communicating via a 3GPP LTE network or the like as discussed herein with respect to FIG. 13. The WWAN transceiver 1320 couples to one or more power amplifiers 1322 that are respectively coupled to one or more antennas 1324 for sending and receiving radio-frequency signals via the WWAN broadband network. The baseband processor 1312 also may control a wireless local area network (WLAN) transceiver 1326 coupled to one or more suitable antennas 1328 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 1310 and baseband processor 1312, and the scope of the claimed subject matter is not limited in these respects. For example, any one or more of SDRAM 1314, NAND flash 1316 and/or NOR flash 1318 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 1310 may drive a display 1330 for displaying various information or data, and may further receive touch input from a user via a touch screen 1332, for example, via a finger or a stylus. In one exemplary embodiment, screen 1332 display a menu and/or options to a user that are selectable via a finger and/or a stylus for entering information into information-handling system 1300.

An ambient light sensor 1334 may be utilized to detect an amount of ambient light in which information-handling system 1300 is operating, for example, to control a brightness or contrast value for display 1330 as a function of the intensity of ambient light detected by ambient light sensor 1334. One or more cameras 1336 may be utilized to capture images that are processed by applications processor 1310 and/or at least temporarily stored in NAND flash 1316. Furthermore, applications processor may be coupled to a gyroscope 1338, accelerometer 1340, magnetometer 1342, audio coder/decoder (CODEC) 1344, and/or global positioning system (GPS) controller 1346 coupled to an appropriate GPS antenna 1348, for detection of various environmental properties including location, movement, and/or orientation of information-handling system 1300. Alternatively, controller 1346 may comprise a Global Navigation Satellite System (GNSS) controller. Audio CODEC 1344 may be coupled to one or more audio ports 1350 to provide microphone input and speaker outputs either via internal devices and/or via external devices coupled to information-handling system via the audio ports 1350, for example, via a headphone and microphone jack. In addition, applications processor 1310 may couple to one or more input/output (I/O) transceivers 1352 to couple to one or more I/O ports 1354 such as a universal serial bus (USB) port, a high-definition multimedia interface (HDMI) port, a serial port, and so on. Furthermore, one or more of the I/O transceivers 1352 may couple to one or more memory slots 1356 for optional removable memory, such as secure digital (SD) card or a subscriber identity module (SIM) card, although the scope of the claimed subject matter is not limited in these respects.

Figure 14:
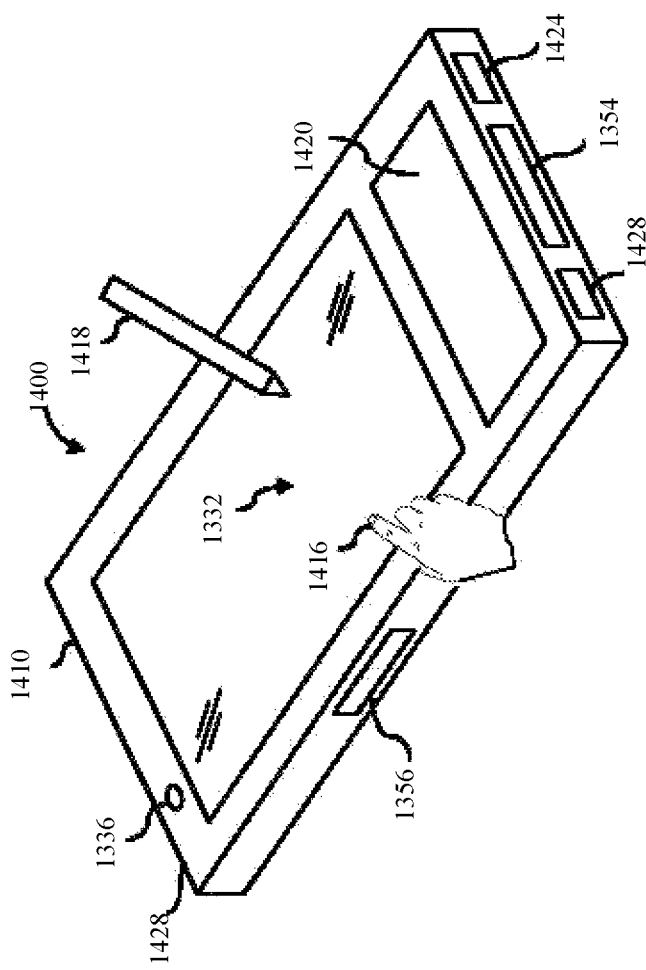
FIG. 14 is an isometric view of an exemplary embodiment of the information-handling system of FIG. 13 that optionally may include a touch screen in accordance with one or more embodiments disclosed herein.

FIG. 14 depicts an isometric view of an exemplary embodiment of the information-handling system of FIG. 13 that optionally may include a touch screen in accordance with one or more embodiments disclosed herein. FIG. 14 shows an example implementation of information-handling system 1300 of FIG. 13 tangibly embodied as a cellular telephone, smartphone, smart-type device, or tablet-type device or the like, that is capable of implementing methods to identify victims and aggressors according to the subject matter disclosed herein. In one or more embodiments, the information-handling system 1300 may comprise any one of the infrastructure nodes, wireless device 400, subscriber station 916, CPE 922, mobile station UE 1311 of FIG. 13, and/or an M2M-type device, although the scope of the claimed subject matter is not limited in this respect. The information-handling system 1300 may comprise a housing 1410 having a display 1330 that may include a touch screen 1332 for receiving tactile input control and commands via a finger 1416 of a user and/or a via stylus 1418 to control one or more applications processors 1310. The housing 1410 may house one or more components of information-handling system 1300, for example, one or more applications processors 1310, one or more of SDRAM 1314, NAND flash 1316, NOR flash 1318, baseband processor 1312, and/or WWAN transceiver 1320. The information-handling system 1300 further may optionally include a physical actuator area 1420 which may comprise a keyboard or buttons for controlling information-handling system 1300 via one or more buttons or switches. The information-handling system 1300 may also include a memory port or slot 1356 for receiving non-volatile memory, such as flash memory, for example, in the form of a secure digital (SD) card or a subscriber identity module (SIM) card. Optionally, the information-handling system 1300 may further include one or more speakers and/or microphones 1424 and a connection port 1354 for connecting the information-handling system 1300 to another electronic device, dock, display, battery charger, and so on. Additionally, information-handling system 1300 may include a headphone or speaker jack 1428 and one or more cameras 1336 on one or more sides of the housing 1410. It should be noted that the information-handling system 1300 of FIGS. 13 and 14 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 15:
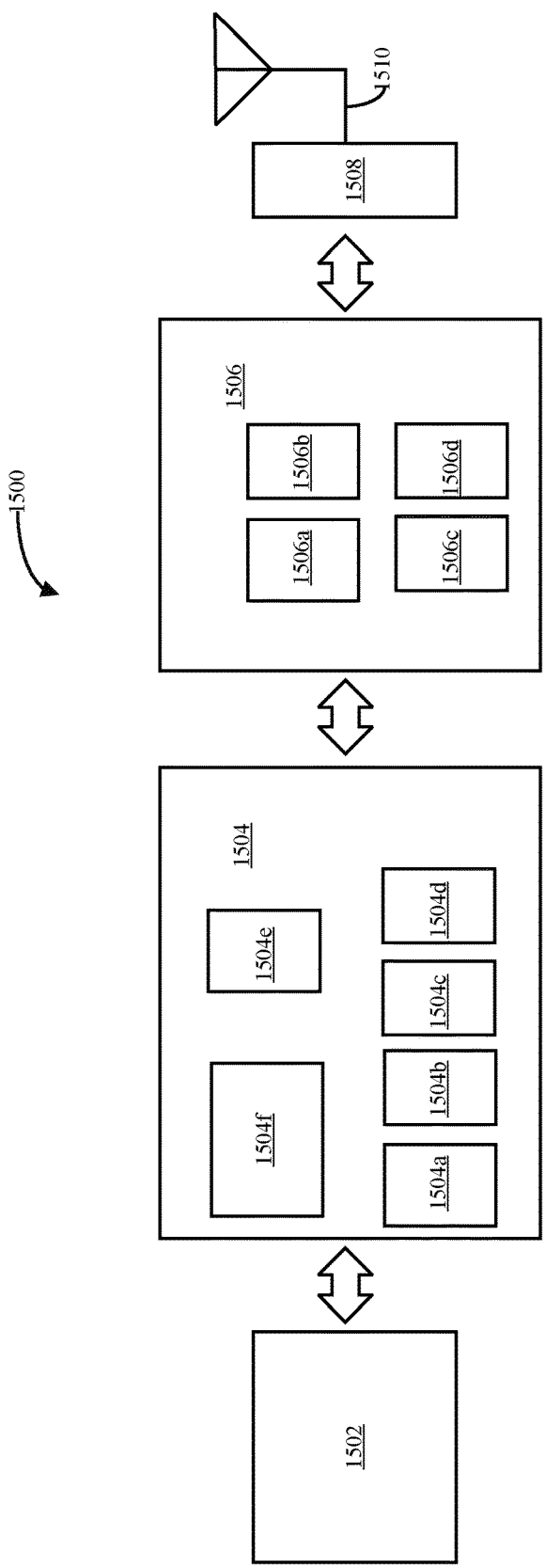
FIG. 15 is a schematic, block diagram illustration of components of a representative UE in accordance with one or more exemplary embodiments disclosed herein.

Embodiments described herein may be implemented into a system using any suitably configured hardware and/or software. FIG. 15 illustrates, for one embodiment, example components of a User Equipment (UE) device 1500. In some embodiments, the UE device 1500 may include application circuitry 1502, baseband circuitry 1504, Radio Frequency (RF) circuitry 1506, front-end module (FEM) circuitry 1508 and one or more antennas 1510, coupled together at least as shown. The application circuitry 1502 may include one or more application processors. For example, the application circuitry 1502 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1504 may include circuitry such as, but not limited to, one or more single-core or multi-core processors. The baseband circuitry 1504 may include one or more baseband processors and/or control logic to process baseband signals received from a receive signal path of the RF circuitry 1506 and to generate baseband signals for a transmit signal path of the RF circuitry 1506. Baseband processing circuitry 1504 may interface with the application circuitry 1502 for generation and processing of the baseband signals and for controlling operations of the RF circuitry 1506. For example, in some embodiments, the baseband circuitry 1504 may include a second generation (2G) baseband processor 1504*a*, third generation (3G) baseband processor 1504*b*, fourth generation (4G) baseband processor 1504*c*, and/or other baseband processor(s) 1504*d* for other existing generations, generations in development or to be developed in the future (e.g., fifth generation (5G), 6G, etc.). The baseband circuitry 1504 (e.g., one or more of baseband processors 1504*a-d*) may handle various radio control functions that enable communication with one or more radio networks via the RF circuitry 1506. The radio control functions may include, but are not limited to, signal modulation/demodulation, encoding/decoding, radio frequency shifting, etc. In some embodiments, modulation/demodulation circuitry of the baseband circuitry 1504 may include Fast-Fourier Transform (FFT), precoding, and/or constellation mapping/demapping functionality. In some embodiments, encoding/decoding circuitry of the baseband circuitry 1504 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1504 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1504*e* of the baseband circuitry 1504 may be configured to run elements of the protocol stack for signaling of the PHY, MAC, RLC, PDCP and/or RRC layers. In some embodiments, the baseband circuitry may include one or more audio digital signal processor(s) (DSP) 1504*f* The audio DSP(s) 1504*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1504 and the application circuitry 1502 may be implemented together such as, for example, on a system on a chip (SOC).

In some embodiments, the baseband circuitry 1504 may provide for communication compatible with one or more radio technologies. For example, in some embodiments, the baseband circuitry 1504 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1504 is configured to support radio communications of more than one wireless protocol may be referred to as multi-mode baseband circuitry.

RF circuitry 1506 may enable communication with wireless networks using modulated electromagnetic radiation through a non-solid medium. In various embodiments, the RF circuitry 1506 may include switches, filters, amplifiers, etc. to facilitate the communication with the wireless network. RF circuitry 1506 may include a receive signal path which may include circuitry to down-convert RF signals received from the FEM circuitry 1508 and provide baseband signals to the baseband circuitry 1504. RF circuitry 1506 may also include a transmit signal path which may include circuitry to up-convert baseband signals provided by the baseband circuitry 1504 and provide RF output signals to the FEM circuitry 1508 for transmission.

In some embodiments, the RF circuitry 1506 may include a receive signal path and a transmit signal path. The receive signal path of the RF circuitry 1506 may include mixer circuitry 1506a, amplifier circuitry 1506b and filter circuitry 1506c. The transmit signal path of the RF circuitry 1506 may include filter circuitry 1506c and mixer circuitry 1506a. RF circuitry 1506 may also include synthesizer circuitry 1506d for synthesizing a frequency for use by the mixer circuitry 1506a of the receive signal path and the transmit signal path. In some embodiments, the mixer circuitry 1506a of the receive signal path may be configured to down-convert RF signals received from the FEM circuitry 1508 based on the synthesized frequency provided by synthesizer circuitry 1506d. The amplifier circuitry 1506b may be configured to amplify the down-converted signals and the filter circuitry 1506c may be a low-pass filter (LPF) or band-pass filter (BPF) configured to remove unwanted signals from the down-converted signals to generate output baseband signals. Output baseband signals may be provided to the baseband circuitry 1504 for further processing. In some embodiments, the output baseband signals may be zero-frequency baseband signals, although this is not a requirement. In some embodiments, mixer circuitry 1506a of the receive signal path may comprise passive mixers, although the scope of the embodiments is not limited in this respect.

In some embodiments, the mixer circuitry 1506a of the transmit signal path may be configured to up-convert input baseband signals based on the synthesized frequency provided by the synthesizer circuitry 1506d to generate RF output signals for the FEM circuitry 1508. The baseband signals may be provided by the baseband circuitry 1504 and may be filtered by filter circuitry 1506c. The filter circuitry 1506c may include a low-pass filter (LPF), although the scope of the embodiments is not limited in this respect.

In some embodiments, the mixer circuitry 1506a of the receive signal path and the mixer circuitry 1506a of the transmit signal path may include two or more mixers and may be arranged for quadrature downconversion and/or upconversion respectively. In some embodiments, the mixer circuitry 1506a of the receive signal path and the mixer circuitry 1506a of the transmit signal path may include two or more mixers and may be arranged for image rejection (e.g., Hartley image rejection). In some embodiments, the mixer circuitry 1506a of the receive signal path and the mixer circuitry 1506a may be arranged for direct downconversion and/or direct upconversion, respectively. In some embodiments, the mixer circuitry 1506a of the receive signal path and the mixer circuitry 1506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1506 may include analog-to-digital converter (ADC) and digital-to-analog converter (DAC) circuitry and the baseband circuitry 1504 may include a digital baseband interface to communicate with the RF circuitry 1506.

In some dual-mode embodiments, a separate radio IC circuitry may be provided for processing signals for each spectrum, although the scope of the embodiments is not limited in this respect.

In some embodiments, the synthesizer circuitry 1506d may be a fractional-N synthesizer or a fractional N/N+1 synthesizer, although the scope of the embodiments is not limited in this respect as other types of frequency synthesizers may be suitable. For example, synthesizer circuitry 1506d may be a delta-sigma synthesizer, a frequency multiplier, or a synthesizer comprising a phase-locked loop with a frequency divider.

The synthesizer circuitry 1506d may be configured to synthesize an output frequency for use by the mixer circuitry 1506a of the RF circuitry 1506 based on a frequency input and a divider control input. In some embodiments, the synthesizer circuitry 1506d may be a fractional N/N+1 synthesizer.

In some embodiments, frequency input may be provided by a voltage controlled oscillator (VCO), although that is not a requirement. Divider control input may be provided by either the baseband circuitry 1504 or the applications processor 1502 depending on the desired output frequency. In some embodiments, a divider control input (e.g., N) may be determined from a look-up table based on a channel indicated by the applications processor 1502.

Synthesizer circuitry 1506d of the RF circuitry 1506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1506 may include an IQ/polar converter.

FEM circuitry 1508 may include a receive signal path which may include circuitry configured to operate on RF signals received from one or more antennas 1510, amplify the received signals and provide the amplified versions of the received signals to the RF circuitry 1506 for further processing. FEM circuitry 1508 may also include a transmit signal path which may include circuitry configured to amplify signals for transmission provided by the RF circuitry 1506 for transmission by one or more of the one or more antennas 1510.

In some embodiments, the FEM circuitry 1508 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1506). The transmit signal path of the FEM circuitry 1508 may include a power amplifier (PA) to amplify input RF signals (e.g., provided by RF circuitry 1506), and one or more filters to generate RF signals for subsequent transmission (e.g., by one or more of the one or more antennas 1510.

In some embodiments, the UE device 1500 may include additional elements such as, for example, memory/storage, display, camera, sensor, and/or input/output (I/O) interface.

The following pertains to further examples.

Example 1 is an apparatus of a network entity capable to establish a communication connection with a user equipment (UE), the network entity comprising processing circuitry to transmit a primary synchronization signal (xPSS) and a beamforming reference signal (xBRS) using transmit beamforming sweeping, receive, from the UE, an identifier associated with one or more beamforming patterns for a downlink signal, receive, from the UE, an uplink transmission of the physical random access channel (PRACH) transmitted using beamforming sweeping, identify at least one beamforming pattern in the uplink transmission of the physical random access channel, and transmit to the UE a signal comprising an identifier associated with the at least one beamforming pattern in the uplink transmission.

In Example 2, the subject matter of Example 1 can optionally include an arrangement in which the signal comprising the identifier associated with the at least one beamforming pattern in the uplink transmission enables the UE to select a beamforming pattern for uplink transmission.

In Example 3, the subject matter of any one of Examples 1-2 can optionally include processing circuitry to repeatedly transmit a primary synchronization signal (xPSS) and a beamforming reference signal (xBRS) using transmit beamforming sweeping on a periodic basis based at least in part on radio resource control (RRC) signaling from a primary cell (PCell).

In Example 4, the subject matter of any one of Examples 1-3 can optionally include logic to processing circuitry to receive, from the UE, a physical random access channel (PRACH) via a omnidirectional antenna, in response to the PRACH, transmit to the UE a timing advance and a Cell Radio Network Temporary Identifier (C-RNTI) for data transmission from the UE, receive, from the user equipment, a physical uplink shared control channel (PUSCH) which contains a request for a beamformed PRACH transmission, in response to the request for a beamformed PRACH transmission, to transmit a physical downlink control channel (PDCCH) to the UE, receive, from the user equipment, the beamformed PRACH transmission, and determine, from the beamformed PRACH transmission, a suitable transmission beam for uplink transmission from the UE.

In Example 5, the subject matter of any one of Examples 1-4 can optionally include an arrangement in which an identifier associated with the suitable transmission beam for uplink transmission from the UE is included in one of reauthorization request (RAR) messages or in downlink control information (DCI) format in the PDCCH.

In Example 6, the subject matter of any one of Examples 1-5 can optionally include processing circuitry to receive, from the UE, a first physical random access channel (PRACH) using a first beamforming weight in a first subframe, in response to a successful detection of the PRACH, to transmit to the use equipment a first RAR message which identifies a first beamforming index identifier associated with the first beamforming weight, receive, from the user equipment, a second physical random access channel (PRACH) using a second beamforming weight in a second subframe, in response to a successful detection of the PRACH, to transmit to the use equipment a second RAR message which identifies the second beamforming index identifier associated with the second beamforming weight, determine, from information in at least the first RAR message and the second RAR message, a suitable transmission beam for uplink transmission from the UE.

In Example 7, the subject matter of any one of Examples 1-6 can optionally include processing circuitry to receive, from the UE, a third physical random access channel (PRACH) using a third beamforming weight in a third subframe, in response to a successful detection of the PRACH, to transmit to the UE a third RAR message which identifies the third beamforming index identifier associated with the third beamforming weight, and determine, from information in at least the first RAR message, the second RAR message, and the third RAR message, a suitable transmission beam for uplink transmission from the UE.

Example 8 is a non-transitory machine-readable medium comprising instructions which, when executed by a processor in a network entity capable to establish a communication connection with a user equipment (UE), configure the processor to transmit a primary synchronization signal (xPSS) and a beamforming reference signal (xBRS) using transmit beamforming sweeping, receive, from the UE, an identifier associated with one or more beamforming patterns for a downlink signal, receive, from the user equipment, an uplink transmission of the physical random access channel (PRACH) transmitted using beamforming sweeping, identify at least one beamforming pattern in the uplink transmission of the physical random access channel, and transmit to the UE a signal comprising an identifier associated with the at least one beamforming pattern in the uplink transmission.

In Example 9, the subject matter of Example 8 can optionally include an arrangement in which the signal comprising the identifier associated with the at least one beamforming pattern in the uplink transmission enables the UE to select a beamforming pattern for uplink transmission.

In Example 10, the subject matter of any one of Examples 8-9 can optionally include processing circuitry to repeatedly transmit a primary synchronization signal (xPSS) and a beamforming reference signal (xBRS) using transmit beamforming sweeping on a periodic basis based at least in part on radio resource control (RRC) signaling from a primary cell (PCell).

In Example 11, the subject matter of any one of Examples 8-10 can optionally include logic to processing circuitry to receive, from the UE, a physical random access channel (PRACH) via a omnidirectional antenna, in response to the PRACH, transmit to the UE a timing advance and a Cell Radio Network Temporary Identifier (C-RNTI) for data transmission from the UE, receive, from the user equipment, a physical uplink shared control channel (PUSCH) which contains a request for a beamformed PRACH transmission, in response to the request for a beamformed PRACH transmission, to transmit a physical downlink control channel (PDCCH) to the UE, receive, from the user equipment, the beamformed PRACH transmission, and determine, from the beamformed PRACH transmission, a suitable transmission beam for uplink transmission from the UE.

In Example 12, the subject matter of any one of Examples 8-11 can optionally include an arrangement in which an identifier associated with the suitable transmission beam for uplink transmission from the UE is included in one of an reauthorization request (RAR) messages or in downlink control information (DCI) format in the PDCCH.

In Example 13, the subject matter of any one of Examples 8-12 can optionally include processing circuitry to receive, from the UE, a first physical random access channel (PRACH) using a first beamforming weight in a first subframe, in response to a successful detection of the PRACH, to transmit to the use equipment a first RAR message which identifies a first beamforming index identifier associated with the first beamforming weight, receive, from the user equipment, a second physical random access channel (PRACH) using a second beamforming weight in a second subframe, in response to a successful detection of the PRACH, to transmit to the use equipment a second RAR message which identifies the second beamforming index identifier associated with the second beamforming weight, determine, from information in at least the first RAR message and the second RAR message, a suitable transmission beam for uplink transmission from the UE.

In Example 14, the subject matter of any one of Examples 8-13 can optionally include processing circuitry to receive, from the UE, a third physical random access channel (PRACH) using a third beamforming weight in a third subframe, in response to a successful detection of the PRACH, to transmit to the UE a third RAR message which identifies the third beamforming index identifier associated with the third beamforming weight, and determine, from information in at least the first RAR message, the second RAR message, and the third RAR message, a suitable transmission beam for uplink transmission from the UE.

Example 15 is an apparatus of a user equipment (UE) capable to establish a communication connection with a network entity, the user equipment comprising processing circuitry to receive, from a network entity, a primary synchronization signal (xPSS) and a beamforming reference signal (xBRS) transmitted using beamforming sweeping, identify at least one suitable transmission beamforming pattern from the network entity, transmit, to the network entity, an identifier associated with the at least one suitable beamforming pattern for a downlink signal, transmit, to the network entity, an uplink transmission of the physical random access channel (PRACH) transmitted using beamforming sweeping, receive, from the network entity, a signal comprising an identifier associated with the at least one suitable beamforming pattern in the uplink transmission, and use the at least one suitable beamforming pattern in subsequent communication with the network entity.

In Example 16, the subject matter of Example 15 can optionally include processing circuitry to transmit the PRACH using a constant power level during beamforming sweeping.

In Example 17, the subject matter of any one of Examples 15-16 can optionally include processing circuitry to transmit, to the network entity, a physical random access channel (PRACH) via a omnidirectional antenna, receive, from the network entity, a timing advance and Cell Radio Network Temporary Identifier (C-RNTI) for data transmission from the UE, transmit, to the network entity, a physical uplink shared control channel (PUSCH) which contains a request for a beamformed PRACH transmission; receive, from the network entity, a physical downlink control channel (PDCCH), transmit, to the network entity, the beamformed PRACH transmission, and receive, from the network entity, a suitable transmission beam for uplink transmission from the UE to the network entity.

In Example 18, the subject matter of any one of Examples 15-17 can optionally include an arrangement in which an identifier associated with the suitable transmission beam for uplink transmission from the UE is included in one of RAR messages or in DCI format in the PDCCH.

In Example 18, the subject matter of any one of Examples 15-18 can optionally include an arrangement in which the DCI format includes configuration information including at least a number of subframes allocated or a number of transmission beams.

In Example 20, the subject matter of any one of Examples 15-19 can optionally include processing circuitry to transmit, to the network entity, a first physical random access channel (PRACH) using a first beamforming weight in a first subframe, receive, from the network entity, a first RAR message which identifies a first beamforming index identifier associated with the first beamforming weight; transmit, to the network entity, a second physical random access channel (PRACH) using a second beamforming weight in a second subframe, receive, from the network entity, a second RAR message which identifies the second beamforming index identifier associated with the second beamforming weight, determine, from information in at least the first RAR message and the second RAR message, a suitable transmission beam for uplink transmission from the UE, transmit, to the network entity, a PUSCH which contains a buffer status report using the suitable transmission beam.

In Example 21, the subject matter of any one of Examples 15-20 can optionally include processing circuitry to transmit, to the network entity, a third physical random access channel (PRACH) broadcast using a third beamforming weight in a third subframe, receive, from the network entity, a third RAR message which identifies the third beamforming index identifier associated with the third beamforming weight, determine, from information in at least the first RAR message, the second RAR message, and the third RAR message, a suitable transmission beam for uplink transmission from the UE.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus of a network entity capable to establish a communication connection with a user equipment (UE), the network entity comprising processing circuitry to:
    transmit a primary synchronization signal (xPSS) and a beamforming reference signal (xBRS) using transmit beamforming sweeping;
    receive, from the UE, an identifier associated with one or more beamforming patterns for a downlink signal;
    receive, from the UE, an uplink transmission of a first physical random access channel (PRACH) transmitted using beamforming sweeping;
    identify at least one beamforming pattern in the uplink transmission of the physical random access channel;
    transmit to the UE a signal comprising an identifier associated with the at least one beamforming pattern in the uplink transmission, wherein the signal comprising the identifier associated with the at least one beamforming pattern in the uplink transmission enables the UE to select a beamforming pattern for uplink transmission;
    repeatedly transmit a primary synchronization signal (xPSS) and a beamforming reference signal (xBRS) using transmit beamforming sweeping on a periodic basis based at least in part on radio resource control (RRC) signaling from a primary cell (PCell);
    receive, from the UE, the first PRACH via a omnidirectional antenna;
    in response to the first PRACH, transmit to the UE a timing advance and a Cell Radio Network Temporary Identifier (C-RNTI) for data transmission from the UE;
    receive, from the user equipment, a physical uplink shared control channel (PUSCH) which contains a request for a beamformed PRACH transmission;
    in response to the request for a beamformed PRACH transmission, transmit a physical downlink control channel (PDCCH) to the UE;
    receive, from the user equipment, the beamformed PRACH transmission; and
    determine, from the beamformed PRACH transmission, a suitable transmission beam for uplink transmission from the UE.

2. The apparatus of claim 1, wherein an identifier associated with the suitable transmission beam for uplink transmission from the UE is included in one of reauthorization request (RAR) messages or in downlink control information (DCI) format in the PDCCH.

3. The apparatus of claim 1, further comprising processing circuitry to:
    receive, from the UE, the first PRACH using a first beamforming weight in a first subframe;
    in response to a successful detection of the first PRACH, transmit to the use equipment a first RAR message which identifies a first beamforming index identifier associated with the first beamforming weight;
    receive, from the user equipment, a second physical random access channel (PRACH) using a second beamforming weight in a second subframe;
    in response to a successful detection of the second PRACH, to transmit to the use equipment a second RAR message which identifies the second beamforming index identifier associated with the second beamforming weight;
    determine, from information in at least the first RAR message and the second RAR message, a suitable transmission beam for uplink transmission from the UE.

4. The apparatus of claim 3, further comprising processing circuitry to:
    receive, from the UE, a third physical random access channel (PRACH) using a third beamforming weight in a third subframe;
    in response to a successful detection of the third PRACH, transmit to the UE a third RAR message which identifies the third beamforming index identifier associated with the third beamforming weight; and
    determine, from information in at least the first RAR message, the second RAR message, and the third RAR message, a suitable transmission beam for uplink transmission from the UE.

5. A non-transitory machine-readable medium comprising instructions which, when executed by a processor in a network entity capable to establish a communication connection with a user equipment (UE), configure the processor to:
    transmit a primary synchronization signal (xPSS) and a beamforming reference signal (xBRS) using transmit beamforming sweeping;
    receive, from the UE, an identifier associated with one or more beamforming patterns for a downlink signal;
    receive, from the user equipment, an uplink transmission of a first physical random access channel (PRACH) transmitted using beamforming sweeping;
    identify at least one beamforming pattern in the uplink transmission of the physical random access channel; and
    transmit to the UE a signal comprising an identifier associated with the at least one beamforming pattern in the uplink transmission, wherein the signal comprising the identifier associated with the at least one beamforming pattern in the uplink transmission enables the UE to select a beamforming pattern for uplink transmission;
    repeatedly transmit a primary synchronization signal (xPSS) and a beamforming reference signal (xBRS) using transmit beamforming sweeping on a periodic basis based at least in part on radio resource control (RRC) signaling from a primary cell (PCell);
    receive, from the UE, the first PRACH via a omnidirectional antenna;
    in response to the first PRACH, transmit to the UE a timing advance and a Cell Radio Network Temporary Identifier (C-RNTI) for data transmission from the UE;
    receive, from the user equipment, a physical uplink shared control channel (PUSCH) which contains a request for a beamformed PRACH transmission;
    in response to the request for a beamformed PRACH transmission, transmit a physical downlink control channel (PDCCH) to the UE;
    receive, from the user equipment, the beamformed PRACH transmission; and determine, from the beamformed PRACH transmission, a suitable transmission beam for uplink transmission from the UE.

6. The non-transitory machine-readable medium of claim 5, wherein an identifier associated with the suitable transmission beam for uplink transmission from the UE is included in one of reauthorization request (RAR) messages or in downlinke control information (DCI) format in the PDCCH.

7. The non-transitory machine-readable medium of claim 5, further comprising instructions which, when executed by the processor, configure the processor to:
 receive, from the UE, the first PRACH using a first beamforming weight in a first subframe;
 in response to a successful detection of the first PRACH, transmit to the use equipment a first RAR message which identifies a first beamforming index identifier associated with the first beamforming weight;
 receive, from the user equipment, a second physical random access channel (PRACH) using a second beamforming weight in a second subframe;
 in response to a successful detection of the second PRACH, to transmit to the use equipment a second RAR message which identifies the second beamforming index identifier associated with the second beamforming weight;
 determine, from information in at least the first RAR message and the second RAR message, a suitable transmission beam for uplink transmission from the UE.

8. The non-transitory machine-readable medium of claim 5, further comprising instructions which, when executed by the processor, configure the processor to:
 receive, from the UE, a third physical random access channel (PRACH) broadcast using a third beamforming weight in a third subframe;
 in response to a successful detection of the third PRACH, to transmit to the UE a third RAR message which identifies the third beamforming index identifier associated with the third beamforming weight;
 determine, from information in at least the first RAR message, the second RAR message, and the third RAR message, a suitable transmission beam for uplink transmission from the UE.

9. An apparatus of a user equipment (UE) capable to establish a communication connection with a network entity, the user equipment comprising processing circuitry to:
 receive, from a network entity, a primary synchronization signal (xPSS) and a beamforming reference signal (xBRS) transmitted using beamforming sweeping;
 identify at least one suitable transmission beamforming pattern from the network entity;
 transmit, to the network entity, an identifier associated with the at least one suitable beamforming pattern for a downlink signal;
 transmit, to the network entity, an uplink transmission of a first physical random access channel (PRACH) transmitted using beamforming sweeping;
 receive, from the network entity, a signal comprising an identifier associated with the at least one suitable beamforming pattern in the uplink transmission;
 use the at least one suitable beamforming pattern in subsequent communication with the network entity;
 transmit, to the network entity, the first physical random access channel (PRACH) via a omnidirectional antenna;
 receive, from the network entity, a timing advance and Cell Radio Network Temporary Identifier (C-RNTI) for data transmission from the UE;
 transmit, to the network entity, a physical uplink shared control channel (PUSCH) which contains a request for a beamformed PRACH transmission;
 receive, from the network entity, a physical downlink control channel (PDCCH);
 transmit, to the network entity, the beamformed PRACH transmission; and
 receive, from the network entity, a suitable transmission beam for uplink transmission from the UE to the network entity.

10. The apparatus of claim 9, further comprising processing circuitry to:
 transmit the first PRACH using a constant power level during beamforming sweeping.

11. The apparatus of claim 9, wherein an identifier associated with the suitable transmission beam for uplink transmission from the UE is included in one of RAR messages or in DCI format in the PDCCH.

12. The apparatus of claim 11, wherein the DCI format includes configuration information including at least a number of subframes allocated or a number of transmission beams.

13. The apparatus of claim 9, further comprising processing circuitry to:
 transmit, to the network entity, the first PRACH using a first beamforming weight in a first subframe;
 receive, from the network entity, a first RAR message which identifies a first beamforming index identifier associated with the first beamforming weight;
 transmit, to the network entity, a second physical random access channel (PRACH) using a second beamforming weight in a second subframe;
 receive, from the network entity, a second RAR message which identifies the second beamforming index identifier associated with the second beamforming weight;
 determine, from information in at least the first RAR message and the second RAR message, a suitable transmission beam for uplink transmission from the UE;
 transmit, to the network entity, a PUSCH which contains a buffer status report using the suitable transmission beam.

14. The apparatus of claim 13, further comprising processing circuitry to:
 transmit, to the network entity, a third physical random access channel (PRACH) broadcast using a third beamforming weight in a third subframe;
 receive, from the network entity, a third RAR message which identifies the third beamforming index identifier associated with the third beamforming weight;
 determine, from information in at least the first RAR message, the second RAR message, and the third RAR message, a suitable transmission beam for uplink transmission from the UE.

* * * * *